W. A. LINQUIST.
AUTOMOBILE FENDER.
APPLICATION FILED SEPT. 5, 1912.

1,114,009.

Patented Oct. 20, 1914.
5 SHEETS—SHEET 1.

WITNESSES
E.C. Skinkle
Geo. Knutson

INVENTOR
WILLIAM A. LINQUIST
BY Williamson & Merchant
ATTORNEYS

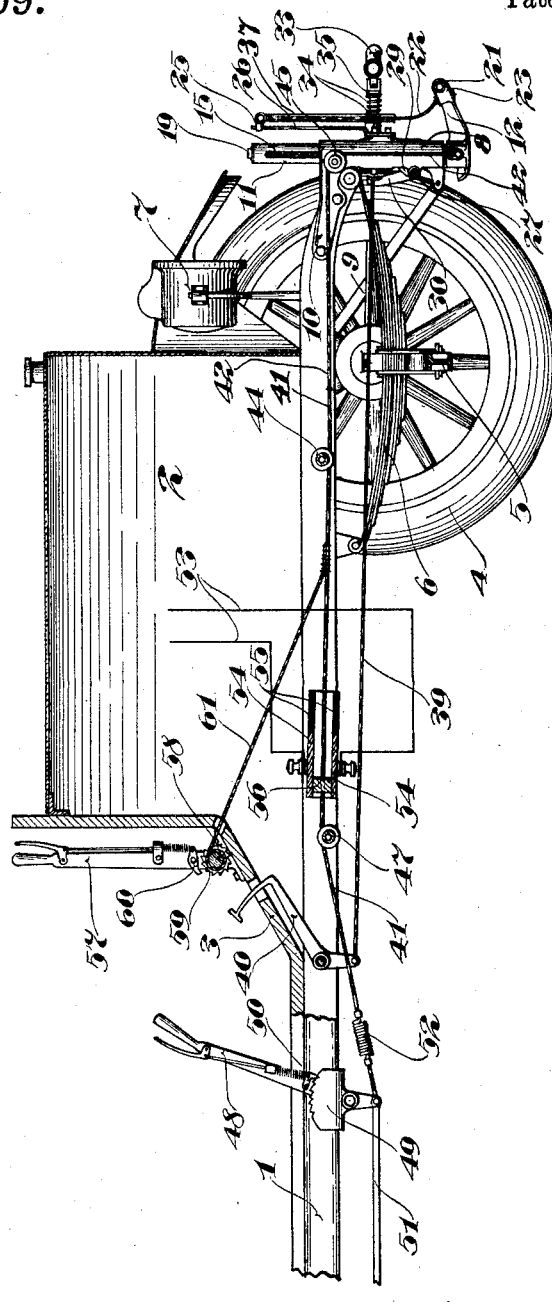
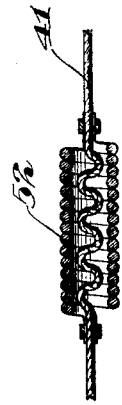

W. A. LINQUIST.
AUTOMOBILE FENDER.
APPLICATION FILED SEPT. 5, 1912.

1,114,009.

Patented Oct. 20, 1914.
5 SHEETS—SHEET 5.

WITNESSES
E. C. Skinkle
Geo. Knutson

INVENTOR
WILLIAM A. LINQUIST
BY Williamson Merchant
ATTORNEYS.

UNITED STATES PATENT OFFICE.

WILLIAM A. LINQUIST, OF MINNEAPOLIS, MINNESOTA.

AUTOMOBILE-FENDER.

1,114,009.  Specification of Letters Patent.  Patented Oct. 20, 1914.

Application filed September 5, 1912. Serial No. 718,646.

*To all whom it may concern:*

Be it known that I, WILLIAM A. LINQUIST, a citizen of the United States, residing at Minneapolis, in the county of Hennepin and State of Minnesota, have invented certain new and useful Improvements in Automobile-Fenders; and I do hereby declare the following to be a full, clear, and exact description of the invention, such as will enable others skilled in the art to which it appertains to make and use the same.

Particularly my present invention relates to automatic fenders and coöperating devices for automobiles, and is in the nature of an improvement on the device disclosed in the claims of my prior Patent, 1,033,425, of July 23rd, 1912, entitled "Automobile fender and coöperating device".

Generally stated, the invention consists of the novel devices and combination of devices hereinafter described and defined in the claims.

In the accompanying drawings, like characters indicate like parts throughout the several views.

Figure 1:
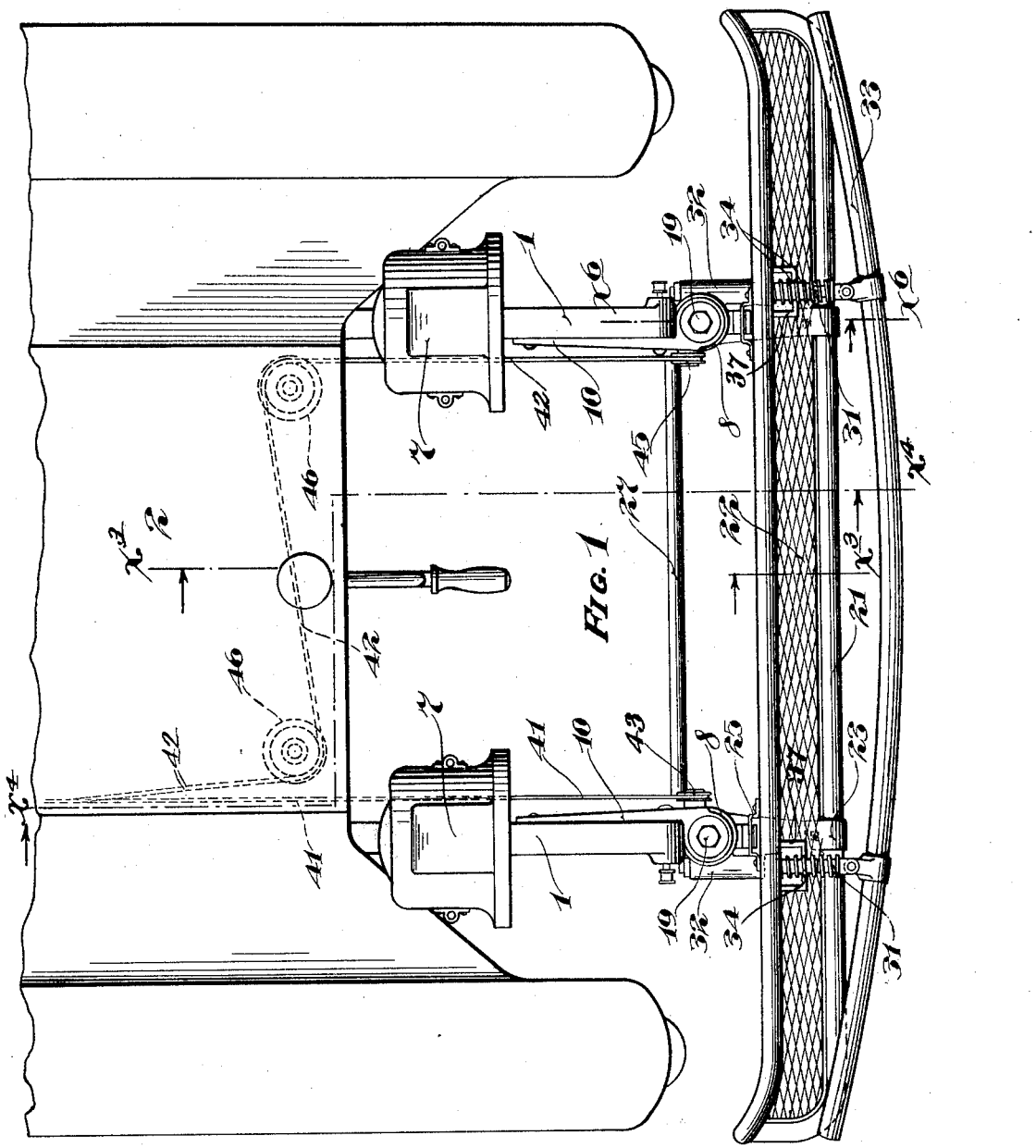
Figure 2:
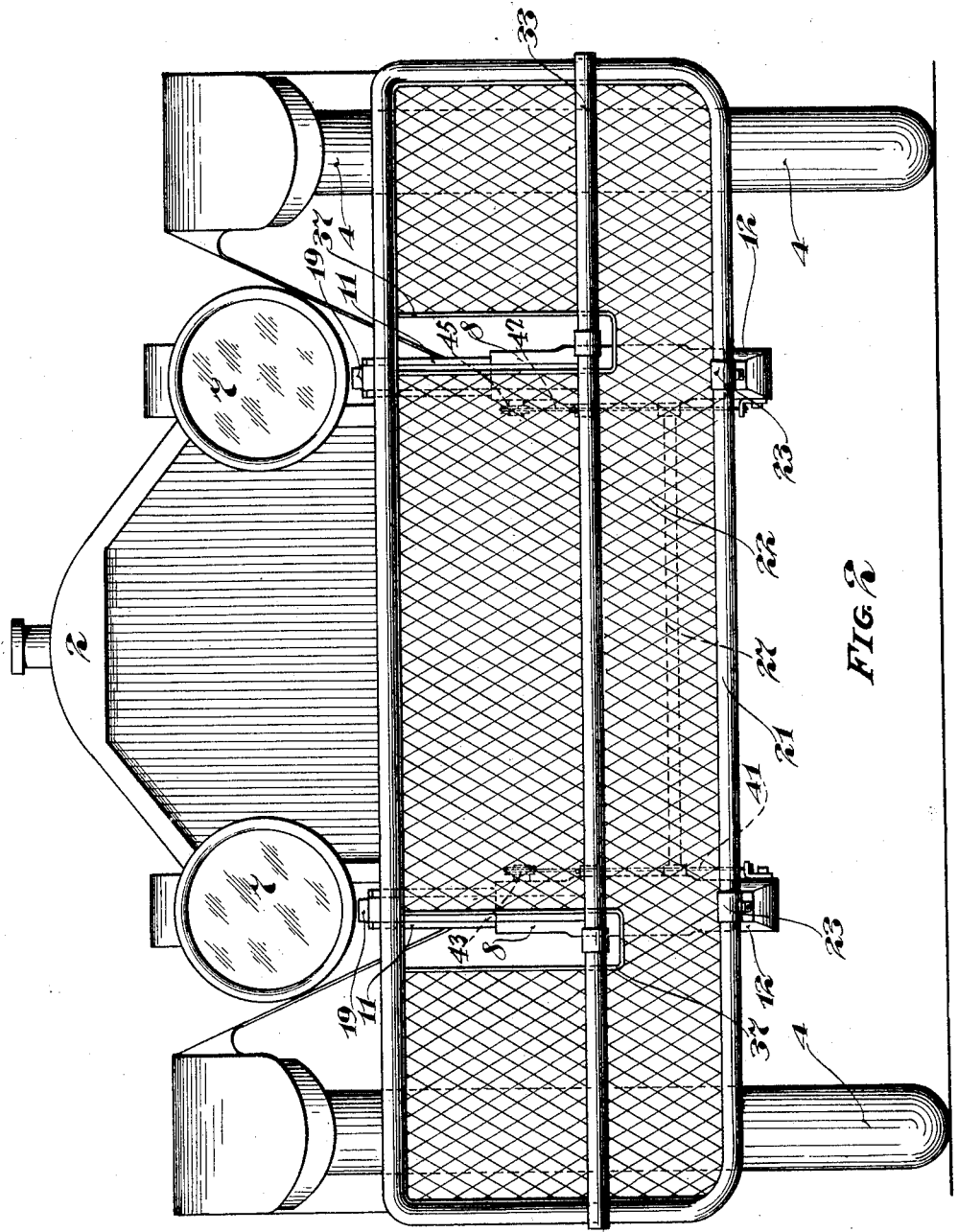
Figure 3:
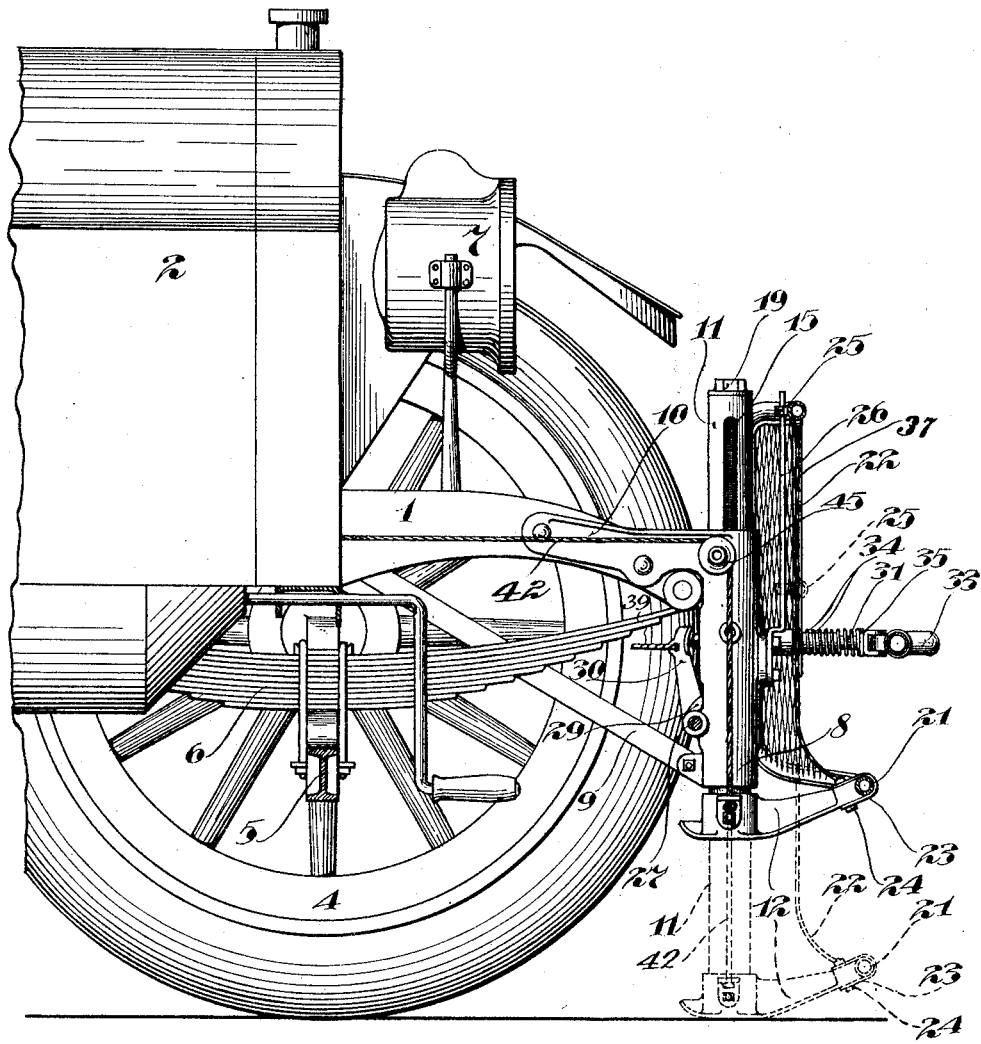
Figure 7:
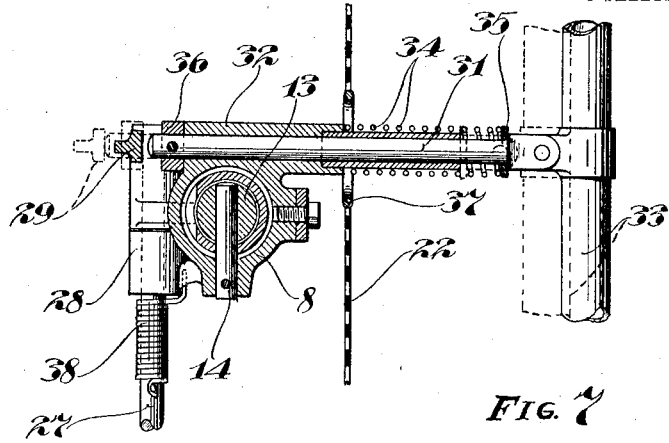
Figure 6:
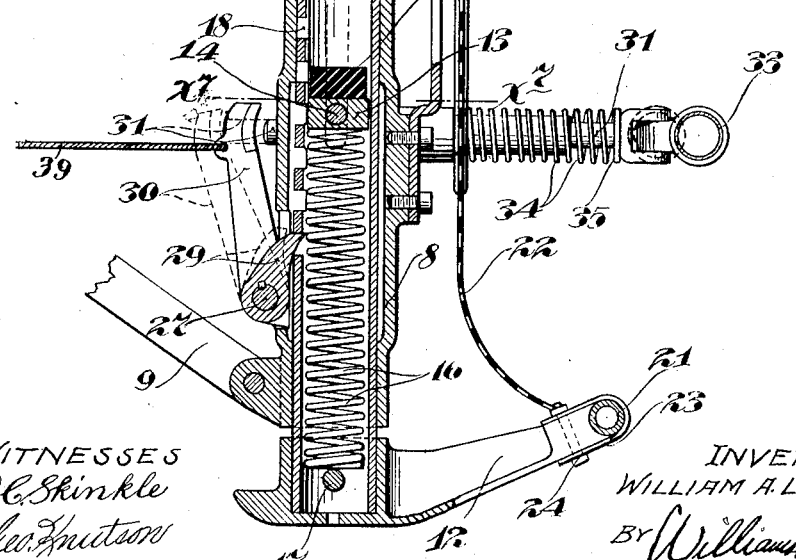

Referring to the drawings, Figure 1 is a plan view showing the front end portion of an automobile and illustrating the improved fender and coöperating devices applied thereto; Fig. 2 is a front elevation of the parts shown in Fig. 1; Fig. 3 is a side elevation of the same parts, some portions being sectioned on the line $x^3$—$x^3$ of Fig. 1 and the dotted lines indicating the trip and drop position of the fender; Fig. 4 is a view, partly in side elevation but chiefly in vertical section taken approximately on the irregular line $x^4$—$x^4$ of Fig. 1; Fig. 5 is a detail in section showing a flexible element of one of the operating connections; Fig. 6 is a vertical section taken approximately on the line $x^6$—$x^6$ of Fig. 1, some of the parts being shown in full; and Fig. 7 is a detail in horizontal section taken on the line $x^7$—$x^7$ of Fig. 6.

Of the standard parts of the automobile, in so far as it is desirable for the purposes of this case to note, the numeral 1 indicates the frame work, the numeral 2, the engine hood, the numeral 3, the foot board and the frame 1, this as shown, being accomplished the front axle, the numeral 6, the front springs and the numeral 7, the head lamps, which parts may be of the usual or any suitable construction.

Long, vertically extended, bearing sleeves or guides 8 are rigidly secured to the projecting front ends of the side bars of the frame 1, this as shown, being accomplished by brace bars 9, and by arms 10, which latter are formed integrally with said sleeves and are riveted or bolted to the said side bars. So called plunger bars 11, which are also preferably tubular, are mounted to move vertically in the sleeves 8, and at their lower ends are provided with rigidly secured ground-engaging shoes 12. Within each tubular plunger bar 11 is a relatively fixed spring abutment 13, shown as secured on the inner end of an anchoring pin 14, the outer end of which is rigidly secured to one side of the coöperating bearing sleeve 8 (see particularly Fig. 7). Each tubular bar 11 has a vertically extended slot 15, through which the corresponding anchoring pin 14 projects, which slot permits free upward and downward movements of the bar 11. and its shoe 12. In each plunger bar 11 is a quite strong coiled spring 16, the upper end of which reacts against the abutment 13, and the lower end of which, as shown, reacts against the pin 17 that is used to connect the shoe 12 to the lower end of the corresponding plunger bar 11.

On the rear sides, the plunger bars 11 are provided with ratchet teeth, formed by cutting vertically spaced notches 18 through the rear walls of said bars. Plugs 19 are preferably placed in the upper ends of the plunger bars 11, and these are adapted to engage with cushion blocks 20, of rubber, or other elastic material, which are shown as loosely placed on each abutment 13, to thereby limit the extreme downward movements of the bars 11 and shoes 12. Said bars 11, and shoes 12, support and carry upward and downward a fender made up of an approximately rectangular marginal frame 21, and net work 22. The lower bar of this fender frame 21 is rigidly secured to the forwardly and upwardly projecting ends of the shoes 12, by means of clamping yokes 23, and bolts 24. The upper bar of said fender frame has rigidly secured thereto perforated guide lugs 25, that slide vertically on upright guide bars 26, that are rigidly secured at their lower ends to the respective bearing sleeves 8.

The automatic means for tripping the fender and for normally holding the same in a raised position, comprises the following elements: The numeral 27 indicates a rock shaft, extended transversely of the machine in front of the wheels 4, and journaled at its ends in bearings 28 on the upright guide sleeves 8. To the ends of this rock shaft 27, are secured retaining dogs 29, that engage the teeth 18 of the plunger bars 11 and normally hold the fender raised with the shoes 12 above the ground. The rock shaft 27 also has upwardly extended tripping arms 30, the upper ends of which are arranged to be engaged by the rear ends of forwardly extended plungers 31, mounted to slide in bearings 32, formed on the sides of the upright sleeves 8. The front ends of these tripping plungers 31, are pivotally connected to a transversely extended tripping bar 33, that is located in front of the fender. Coiled springs 34, which surround the plungers 31, are compressed between the bearings 32 and collars 35 on said plungers and yieldingly hold the tripping bar 33 forward as far as permitted by stock collars 36 on the rear ends of said plungers (see particularly Fig. 7).

The plungers 31, it will be noted, project forward through the fender, and to permit free vertical movements of the fender, with respect to the plungers 31, the netting 22 is cut away and provided with reinforcing frames 37. The retaining dogs 29, are yieldingly held in operative positions, as shown, by coiled torsion springs 38, anchored at one end to the rock shaft 27, and at their other end to the bearings 28; obviously, when the tripping bar 33 and the plungers 31 are pressed rearward, the retaining dogs 29 will be simultaneously disengaged from the teeth 18 of the plunger bars 11, thereby releasing the fender and permitting the same to be quickly forced down, by the springs 16, until the shoes 12 strike the ground, or the caps 19 of said bars 11 strike the buffer or cushion block 20.

I also provide means whereby, at will, the operator may trip and release the fender for downward movement, this means, as shown, comprising a tripping cable 39, attached at its front end to one of the tripping arms 30 and at its rear end attached to a foot actuated tripping lever 40, which, as shown, is intermediately pivoted to the frame 1 and works through a perforation in the foot board 3. Also I provide means whereby the downward movement of the fender and the plunger bars 11 and shoes 12, under the action of the coiled spring 16, will break the engine sparking circuit and set the brakes of the automobile. This means comprises a lifting cable 41, having a branch cable 42, the former being passed over guide sheaves 43 and 44 respectively, on the adjacent bearing sleeve 8 and on the adjacent side of the frame 1 and while the branch cable 42 is passed over the idle guide sheave 45 on the opposite sleeve 8 and over the idle guide sheaves 46 on the frame 1. The cable 41 is also passed over an idle guide sheave 47 and at its rear end is attached to the lower end of the customary emergency brake lever 48. This brake lever 48, as is usual, is pivoted to a latch segment 49, has a spring pressed retaining dog 50 for coöperation with said latch segment and has the customary brake actuating rod 51. In the cable 41 is attached a coiled spring 52, (see Figs. 4 and 5) which normally produces a kink in said cable and takes up the slack therein.

The numeral 53 (see Fig. 4) indicates the leads of the sparking circuit of the automobile engine, not shown. These leads 53, are connected to parallel contact plates 54, between which the cable 41 is passed. The plates 54 have parallel extensions 55 of insulating material. Secured to the cable 41 is a movable contact 56, which, when the fender is raised with the shoes 12 above the ground, engages the contact plates 54, and closes the sparking circuit 53 at that point. When, however, the fender is dropped under the action of the springs 16, the movable contact 54, will be drawn forward into engagement with the insulating extensions 55; thereby breaking the sparking circuit 53, with the result that the explosive engine of the automobile will be stopped, or thrown out of action. This same downward movement of the fender, acting through the cable 41, and the emergency lever 48, automatically sets the brakes in a manner more fully disclosed and claimed in my said prior patent above identified.

I also provide means whereby the operator, without leaving the machine, or while seated on the front seat, may restore the fender to its raised position. This means includes a hand operated lever 57, pivoted on the short shaft 58, journaled in suitable bearings on the foot board 3. The shaft 58 serves as a windlass drum and it is provided with a ratchet wheel 59, that is adapted to be engaged by a spring retracted, hand operated dog 60, carried by the lever 57.

61 indicates a branch cable, attached at one end to the main cable 41 and at its other end attached to and adapted to be wound upon the windlass shaft 58.

Under short, oscillatory movements of the lever 57, the fender may be raised, step by step, the retaining dogs 27 serving to hold said fender in whatever position it may be lifted by the said lever. It must be seen that the fender may be normally set in any desired vertical position, with the shoes 12 raised only slightly, or very considerably, above the ground. On smooth roads, such as found in the cities, the shoes may be set very close to the ground, while for rough, country roads, the shoes and the fender may be set as high as desirable.

The pivotal connections between the tripping bar and the tripping plungers, prevent binding and permit of more or less independent movements of the said tripping plungers.

What I claim is:

1. The combination with a vehicle, of upright bearing sleeves carried by the front portion of the frame thereof and having forwardly offset vertical guides, of plunger bars working vertically through said bearing sleeves and having shoes at their lower ends, and a fender attached to said shoes having its upper portion held for vertical movements by the offset guides of said bearings.

2. The combination with a vehicle, of upright bearing sleeves secured to the front portion of the frame thereof, tubular plunger bars working in said bearing sleeves and provided with vertical slots and having shoes at their lower ends, abutments within said tubular plunger bars having stems projecting through the slots thereof and anchored to said bearing sleeves, and a fender attached to said shoes and movable downward therewith.

3. The combination with a vehicle, of bearing sleeves secured to the front of the frame thereof, and plunger bars working in said bearing sleeves and provided at their lower ends with shoes, guide bars secured at their lower ends to said sleeves, means for holding said plunger bars and shoes raised and for releasing the same, and a fender comprising a marginal frame and netting, the lower bar of said frame being attached to the front ends of said shoes, and the upper bar of said frame having guides mounted to slide vertically on said guide bars.

4. The combination with a vehicle, of vertical guides on the front portion of the frame thereof, plunger bars mounted to move vertically in said guides and having vertically spaced teeth, shoes applied to the lower ends of said plunger bars, a fender attached to said shoes, a rock shaft journaled to the said vertical guides and having retaining dogs simultaneously operative on the vertically spaced teeth of said plunger bars, and means operative on said rock shaft to simultaneously release said retaining dogs and thereby permit said plunger bars, shoes and fender to be lowered.

5. The combination with a vehicle, of vertical guides on the front portion of the frame thereof, plunger bars mounted to move vertically in said guides and having vertically spaced teeth, shoes applied to the lower ends of said plunger bars, a fender attached to said shoes, a rock shaft journaled to the said vertical guides and having retaining dogs simultaneously operative on the vertically spaced teeth of said plunger bars, and means operative on said rock shaft to simultaneously release said retaining dogs and thereby permit said plunger bars, shoes and fender to be lowered, the said tripping means comprising a forwardly spring-pressed tripping bar, supported in front of said fender.

In testimony whereof I affix my signature in presence of two witnesses.

WILLIAM A. LINQUIST.

Witnesses:
 HARRY D. KILGORE,
 F. D. MERCHANT.

---

Copies of this patent may be obtained for five cents each, by addressing the "Commissioner of Patents, Washington, D. C."